United States Patent [19]

Grauel et al.

[11] Patent Number: 4,496,192
[45] Date of Patent: Jan. 29, 1985

[54] PRESSURE MEDIUM BRAKE SYSTEM

[75] Inventors: Ingolf Grauel, Vaihingen/Enz; Gerald Höfer, Flacht; Günter Kulke, Esslingen; Werner Stumpe, Kornwestheim, all of Fed. Rep. of Germany

[73] Assignee: Robert Bosch GmbH, Stuttgart, Fed. Rep. of Germany

[21] Appl. No.: 395,878

[22] Filed: Jul. 7, 1982

[30] Foreign Application Priority Data

Aug. 27, 1981 [DE] Fed. Rep. of Germany ....... 3133963

[51] Int. Cl.³ .............................................. B60T 11/24
[52] U.S. Cl. ......................................... 303/13; 303/2; 303/40
[58] Field of Search ..................... 303/2, 7, 13, 14, 25, 303/28, 40

[56] References Cited

U.S. PATENT DOCUMENTS 3,259,439  7/1966  Bueler ................................... 303/40
3,443,839  5/1969  Hinrichs et al. .................. 303/40 X
4,025,127  5/1977  Rembold ............................ 303/40 X Primary Examiner—Duane A. Reger
Attorney, Agent, or Firm—Edwin E. Greigg

[57] ABSTRACT

A pressure medium brake system for motor vehicles is proposed in which a high-pressure-producing apparatus and a normal-pressure brake apparatus are provided. The brake pressure is reduced with the aid of pressure limiters from high pressure to normal pressure. In order to attain rapid filling of the brake cylinders, one relay valve is disposed before each group of brake cylinders, the relay valves being triggered with normal pressure and very rapidly directing the high pressure into the brake cylinders with a large pressure drop. Upon attaining the maximum pressure level of the normal pressure, the supply of high pressure in the relay valve is cut off. The pressure medium brake system is preferably used as a compressed-air brake system for trucks and trailer-trucks.

7 Claims, 3 Drawing Figures

PRESSURE MEDIUM BRAKE SYSTEM

BACKGROUND OF THE INVENTION

The present invention relates to a pressure medium brake system for motor vehicles having a high-pressure producing apparatus and a normal-pressure brake apparatus, and pressure limiters which regulate the high pressure down to normal pressure.

A brake system of this kind is known. See, for example, German Auslegeschrift (published patent application) No. 24 52 171. In this known brake system, the normal-pressure brake apparatus is preceded by pressure limiters, which regulate the high pressure of the high-pressure-producing apparatus down to normal pressure. For specific applications, such an apparatus is advantageous, particularly given the arrangement of lines selected in that case, which permits the monitoring of four brake circuits with only two pressure limiters. However, a particularly rapid actuation of the braking action cannot be attained with a brake system of this kind.

OBJECT AND SUMMARY OF THE INVENTION

It is an object of the present invention to provide an improved pressure medium brake system for motor vehicles in which four brake circuits can be monitored with only two pressure limiters, and braking action initiated rapidly.

According to the present invention additional valves are provided in communication with the high pressure and directly with the particular brake cylinders.

The pressure medium brake system of the present invention has the advantage over the prior art in that the braking action is initiated particularly rapidly. It is furthermore advantageous that components already existing in the system can also be used for rapid initiation of braking. In order to attain this, the high pressure of the high-pressure-producing apparatus which is present in any event is also utilized to attain a rapid initiation of pressure.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
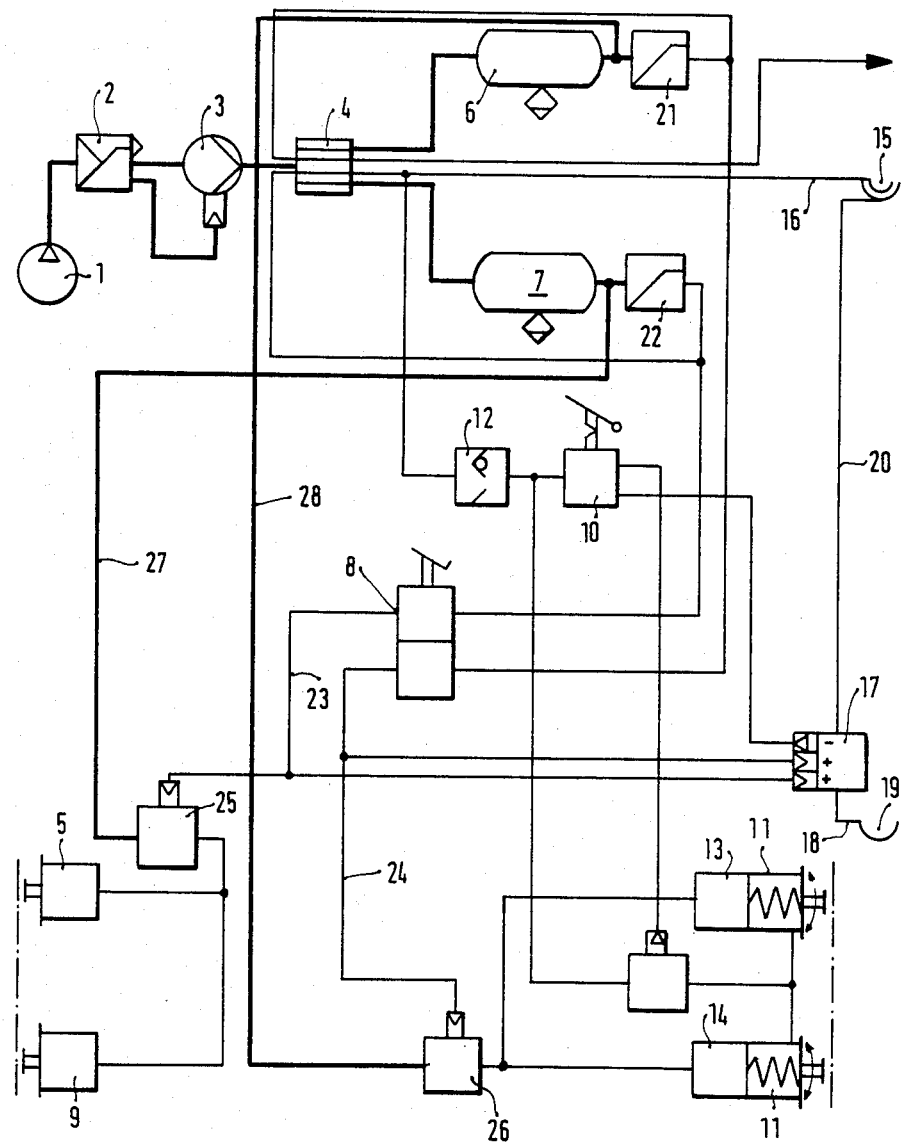
FIG. 1 shows a dual-circuit compressed-air brake system having a relay valve disposed before the front axle brake cylinders.

A dual-circuit compressed-air brake system has a compressor 1 for generating high air pressure of approximately 15 bar. The compressor 1 is connected via a pressure regulator 2 and a frost protection pump 3 to a multiple-circuit protection valve 4 for four brake circuits, this protection valve 4 being supplied with the high air pressure. Two of the brake circuits are the vehicle brake circuits I and II. They have two supply containers 6 and 7, which supplies the brake cylinders 5, 9, 13, 14 on the tractor vehicle via relay valves 24 and 25 which are controlled or triggered by a foot-actuated dual-circuit brake valve 8 and lines 23 and 24 that lead from the brake valve 8 to the relay vales 25 and 26, and a parking brake valve 10, which is intended for monitoring spring reservoir brake cylinders 11; this circuit is supplied via a check valve 12 from a trailer supply line 16 having a supply line coupling head 15.

The compressed air controlled by the brake valve 8 and the air from the spring reservoir circuit proceed to a trailer control valve 17, to which a trailer brake line 18 having a brake line coupling head 19 and a connecting line 20 to the supply line coupling head 15 are connected.

The high-pressure-producing system includes the elements 1–4, 6 and 7. Pressure limiters 21 and 22 are disposed following the containers 6 and 7, so that normal pressure prevails in the following brake system.

In each of the brake lines 23 and 24 leading from the dual-circuit brake valve 8 relay valves 25 and 26 control the high pressure flow to the tractor brake cylinders 5, 9, 13, 14, such that the brake lines 23 and 24 are used solely as control lines. As needed, a load-dependent brake force regulator may also be disposed in the brake line 24. The pressure to be controlled by the relay valves 25 and 26 is derived from the high-pressure-producing system 1–4, 6 and 7, and is drawn directly from the high-pressure containers 6 and 7 via pressure lines 27 and 28.

Mode of Operation

Upon actuation of the dual-circuit brake valve 8, a control pressure at the level of the normal pressure up to a maximum of 7.5 bar is directed into the brake lines 23 and 25. The high pressure present at the relay valves 25, 26, at a level of approximately 15 bar, flows via the relay valves 25, 26 to the brake cylinders 5, 9, 13, 14. Because of the great pressure drop, this flow is effected very rapidly, at sonic speed. The wheel brakes respond rapidly. If a pressure of approximately 7.5 bar is attained at the output of the relay valves, then the relay valves 25, 26 close; in other words, the high pressure of the high-pressure system is limited here by the control pressure.

In this manner, even in the event of rapid braking, the brake cylinders are filled still more rapidly. Thus short threshold times can be attained. What is essential here is that the pressure level of the relay valves 25, 26 is raised such that in every case the air flows to the following brake cylinders 5, 9, 13, 14 at approximately the speed of sound until the point of complete actuation, that is, 7.5 bar.

Several basic designs will now be described for the system according to the invention.

The air quantity (m) flowing into the brake cylinders per unit of time is dependent upon the pressure ratio pa/pe, where pe is the input pressure, that is, the supply pressure (equal to high pressure), while pa is the output pressure to the brake cylinders. Up to the critical pressure ratio $(pa/pe)_{crit}$, the inflowing air quantity is limited by the speed of sound. The critical pressure ratio can be the speed of sound. The critical pressure ratio can be computed on the basis of $$(pa/pe)_{crit} = \left(\frac{2}{x+1}\right)^{\frac{x}{x-1}}$$

with $x=1.4$, resulting in $(pa/pe)_{crit}=0.528$ (pe and pa are measured in absolute pressures).

As long as $pa \leq 0.528 \cdot pe$, the maximum air quantity flows into the brake cylinders. In order to attain the shortest possible fill time until reaching a cylinder pressure of 7.5 bar, the pressure on the supply pressure side should be $$\frac{7.5 + 1}{0.528} - 1 \approx 15 \text{ bar of high pressure.}$$

Figure 2:
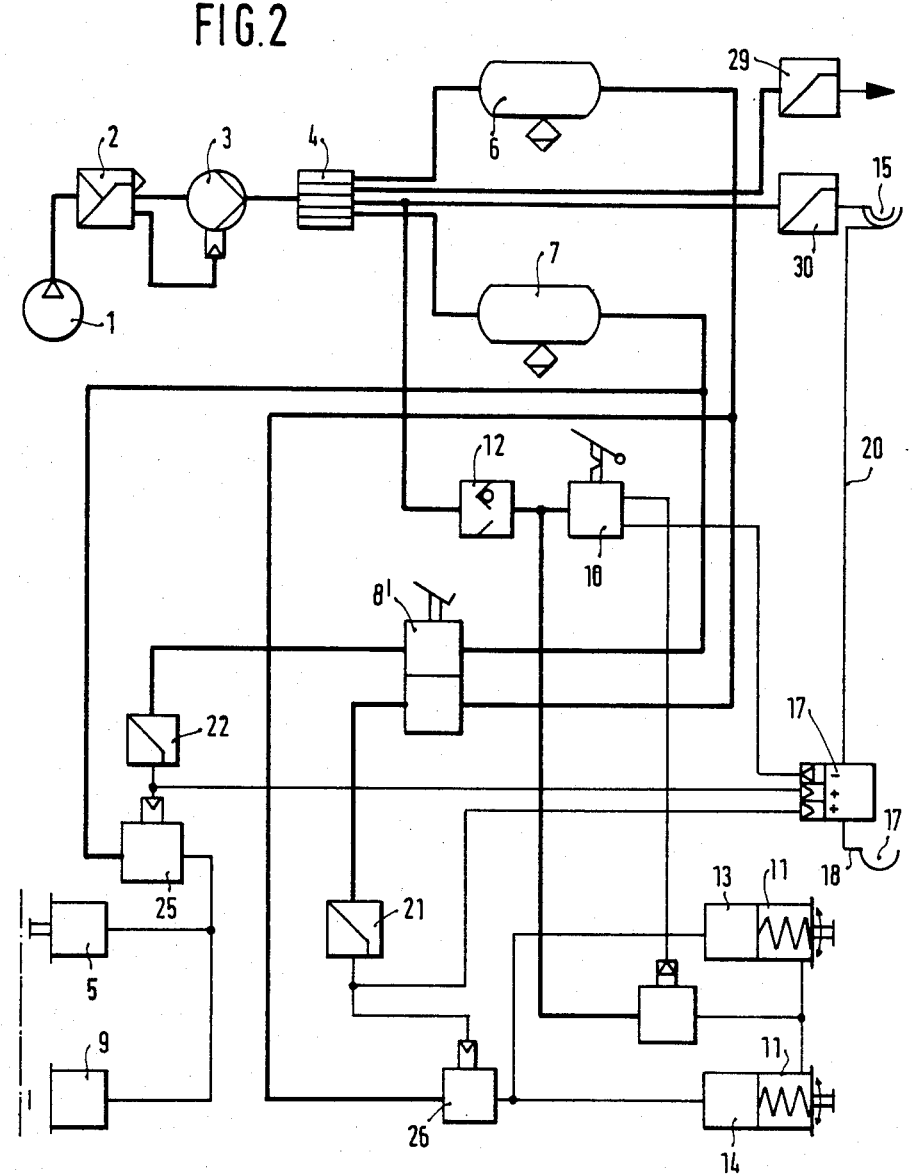
FIG. 2 shows a brake system similar to that of FIG. 1 but with more extensive high-pressure supply.

In FIG. 2, a similar brake system is shown to that of FIG. 1. Corresponding elements are therefore identified by the same reference numerals. The pressure limiters 21 and 22 in this case are disposed in a different location, however, that is not directly behind the high-pressure supply containers 6 and 7 but rather directly ahead of the relay valves 25 and 26. One each of two further pressure limiters 29, 30 is disposed in the supply line 16 and in the fourth brake circuit (auxiliary consumer), respectively.

In this design, a dual-circuit brake valve 8' is disposed on the high-pressure side. The control characteristic of this brake valve 8' is designed for the maximal pressure of the normal-pressure brake system. When the dual-circuit brake valve from the normal-pressure brake system is used, the pressure limiters 21 and 22 assure that an excessive pressure will not reach the relay valves 25 and 26. The advantage of the high air throughput provided by the invention is thus retained.

The mode of operation of the embodiment shown in FIG. 2 otherwise corresponds to that of FIG. 1.

Figure 3:
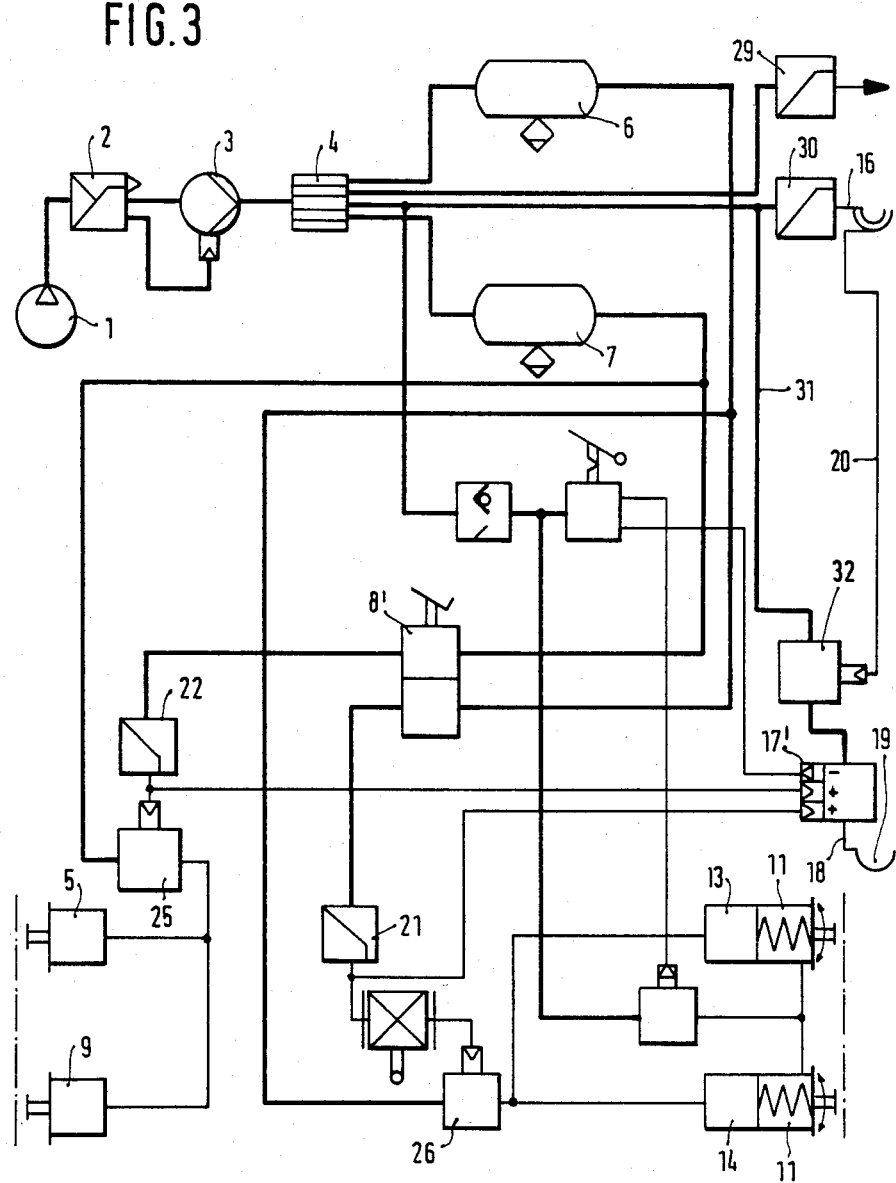
FIG. 3 is a modification of the type shown in FIG. 2 with an additional provision for a trailer.

FIG. 3 shows a brake system in which, in a modification of the design of FIG. 2, a trailer control valve 17' can also be supplied with high pressue via a pressure line 31. The triggering of the trailer control valve 17' is effected in the conventional manner with normal pressure, that is, by brake circuits 1 and 2 with a pressure increase (+) and by the spring reservoir brake circuit with a pressure drop (−). The connecting line 20 is supplied with supply pressure from a trailer supply line 16 and is used for triggering a 2/2-way valve 32 disposed in the line 31 and monitoring its line passage. The valve 32 may, however, be integrated with the trailer control valve 17'.

In this manner, the pressure level in the trailer control valve 17' is raised as well, so that the air still flows to the trailer up to the point of complete shut-off, that is, up to a pressure level of 7.5 bar, with approximately the speed of sound.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. In a pressure medium brake system for motor vehicles having different pressure circuits, the system including: a high-pressure fluid producing system; a normal-pressure fluid brake system; and pressure limiting means connected to the high-pressure producing system and the normal-pressure brake system to regulate the high pressure downward to the normal pressure, the improvement comprising,
   valve means having an outlet connected to different pressure circuits and an inlet connected to the high-pressure producing system and a dual circuit brake valve for controlling fluid under normal pressure to control said valve means to control fluid under high pressure for a rapid pressure increase at the pressure circuits to a maximum level of the normal pressure.

2. In the pressure medium brake system as defined in claim 1, wherein the pressure circuits comprise more than one pair of brake cylinders, and wherein said valve means comprise a separate relay valve for each pair of brake cylinders.

3. In the pressure medium brake system as defined in claim 1, wherein the pressure circuits comprise two pairs of brake cylinders forming a dual brake circuit and wherein said valve means comprises a dual-circuit brake valve connected directly to the high-pressure producing apparatus.

4. In the pressure medium brake system as defined in claim 3, wherein the dual-circuit brake valve has a control characteristic whereby maximal pressure of the normal-pressure brake apparatus is achieved.

5. In the pressure medium brake system as defined in claim 3, wherein a pressure limiting means is provided for each circuit downstream of the dual-circuit brake valve.

6. In the pressure medium brake system as defined in claim 1, wherein the improvement further comprises:
   a trailer control valve; and
   a pressure line connecting the trailer control valve to the high-pressure producing system and wherein the trailer control valve is triggered by normal pressure.

7. In the pressure medium brake system as defined in claim 6, wherein the improvement further comprises:
   a trailer pressure supply line;
   a 2/2-way valve connected in the pressure line to the trailer control valve; and
   a connecting line connecting the trailer pressure suppy line to the 2/2-way valve and wherein the 2/2-way valve is actuated by the pressure in the connecting line.

* * * * *